Nov. 10, 1970     R. M. CARNELL     3,538,695
FRUIT PICKING DEVICE
Filed Aug. 18, 1969     3 Sheets-Sheet 1
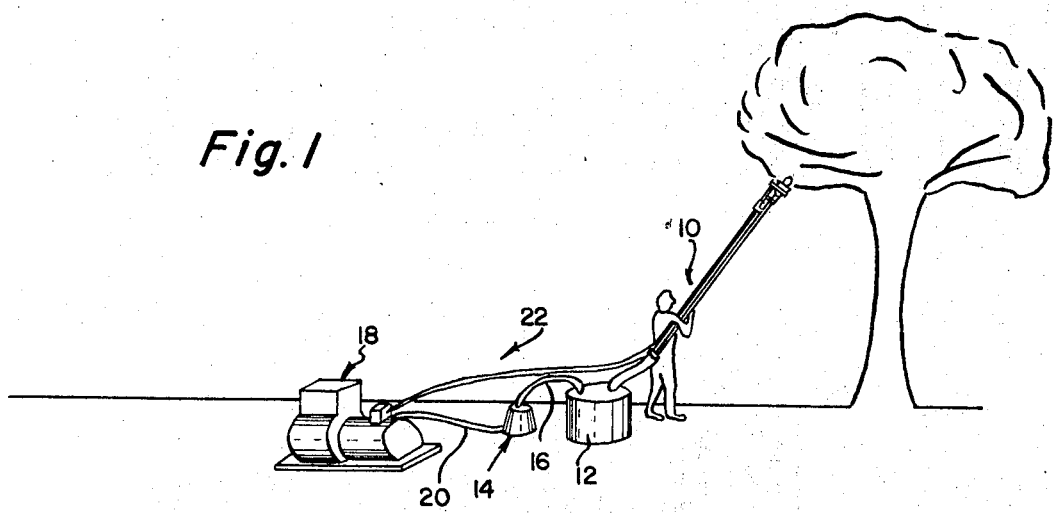
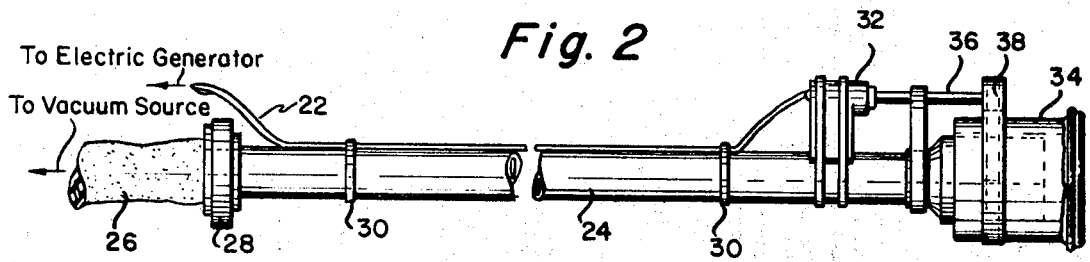
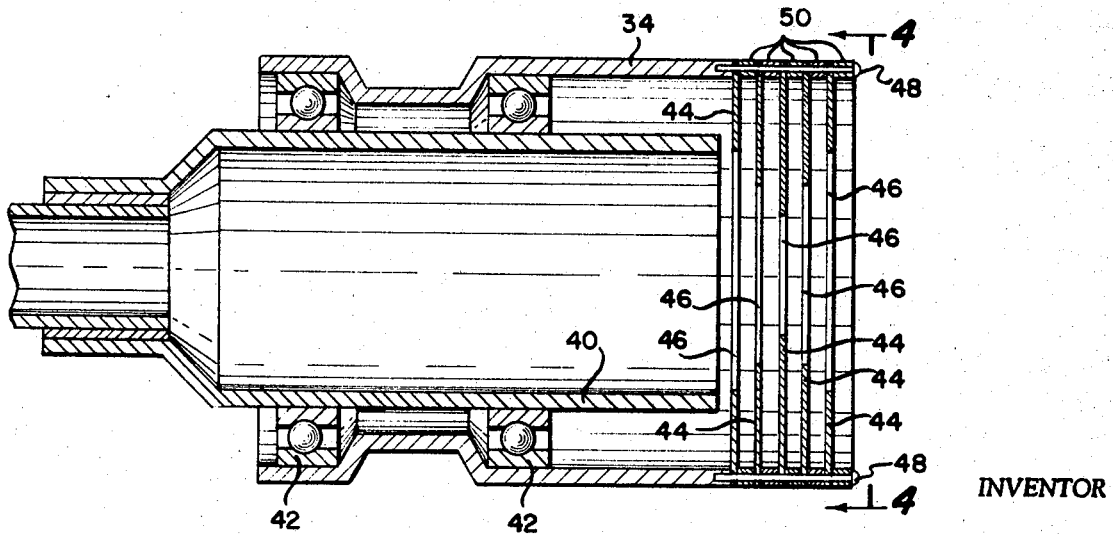
INVENTOR
Richard M. Carnell
BY *Schlesinger, Arkwright & Harvey*
ATTORNEYS Nov. 10, 1970  R. M. CARNELL  3,538,695
FRUIT PICKING DEVICE
Filed Aug. 18, 1969  3 Sheets-Sheet 3

INVENTOR
Richard M. Carnell

BY Slesinger, Arkwright & Garvey
ATTORNEYS

United States Patent Office 3,538,695
Patented Nov. 10, 1970

3,538,695
FRUIT PICKING DEVICE
Richard M. Carnell, Winter Park, Fla., assignor to Agtech Systems Corporation, Vero Beach, Fla., a corporation of Florida
Continuation-in-part of application Ser. No. 663,400, Aug. 25, 1967. This application Aug. 18, 1969, Ser. No. 850,858
Int. Cl. A01g 19/08
U.S. Cl. 56—332                             26 Claims

ABSTRACT OF THE DISCLOSURE

A fruit picking device including a tubular member through which fruit may pass connected at one end to a source of suction, and connected at the other end to a fruit picking head. The fruit picking head includes a means for defining a tortuous path for the fruit as the fruit passes through the head, and the tortuous path provides a twisting motion for the fruit to twist the fruit from its stem.

REFERENCE TO RELATED APPLICATION

This application is a continuation-in-part of my application Ser. No. 663,400, filed Aug. 25, 1967, and now abandoned, on a Fruit Picking Device.

BACKGROUND OF THE INVENTION

This invention relates to an improved fruit picking device of simple and lightweight construction which may be used to pick fruit of various sizes without any need for costly adjustments to the apparatus.

Fruit picking devices of prior art type have been seriously limited in their ability to pick such fruit as oranges, the size of which may vary considerably in a grove. For this reason, many oranges are missed by prior art pickers. Although this invention will be described with respect to oranges, it will be understood that it may be used to pick other fruit such as apples, grapefruit, lemons, peaches, pears, plums, persimmons, or the like.

OBJECTS OF THE INVENTION

It is therefor an object of the present invention to provide a fruit picking device of simple, lightweight, economical construction embodying a minimum of parts which may be readily assembled, the device enabling the tree to be reached for harvesting by a picker standing on the ground or on a conveyance.

Another object of this invention is to provide a fruit picking device capable of picking different sizes of fruits without any changes necessary to the device.

Still another object of this invention is to provide a fruit picking device of the character described wherein the fruit is twisted and pulled from its stem.

It is a further object of this invention to provide a fruit picking device which is highly efficient in its operation, and is capable of picking close to 100% of the fruit.

These and other objects and advantages of this invention will be apparent from the following description and claims.

DESCRIPTION OF THE DRAWINGS

In the accompanying drawings which illustrate by way of example various embodiments of this invention:

FIG. 1 is a plan view of the device of the present invention illustrating its application;

FIG. 2 is a fragmentary side elevational view of the fruit picking device of the present invention per se;

FIG. 3 is a sectional view of the fruit picking head of my invention showing one embodiment thereof;

DESCRIPTION OF INVENTION

Figure 6:
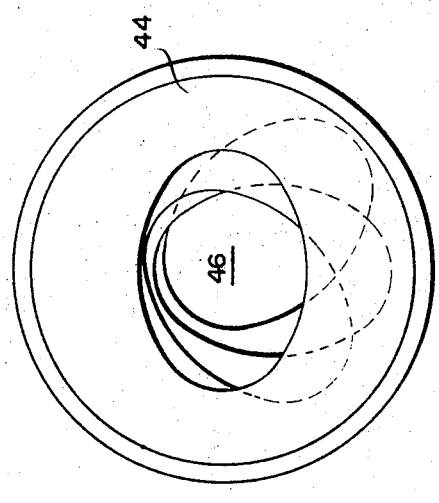
FIG. 6 is an end view of the picker head illustrating an alternate embodiment thereof.

Referring now in greater detail to the drawings, there is illustrated in FIG. 1 an assembly for picking fruit in accordance with the present invention, which includes a fruit picking device constructed in accordance with the present invention which is generally designated 10. The device is in operative connection with a container 12 for receiving fruit from device 10. 14 denotes a suction source in communication with container 12 by means of a hose or the like 16. A generator 18 of conventional type operates vacuum source 14 through an electrical conduit 20, the generator also being connected by electrical line 22 to the fruit picking device 10 for purposes which will be hereinafter more fully set out.

As shown in FIG. 2, fruit picking device 10 includes a tubular member 24 which is of lightweight construction and which may be of any desired length. The internal diameter of tubular member 24 is larger than the diameter of the largest fruit being picked in order to permit free travel thereof through the length of the boom. The lower end of tubular member 24 is connected to a flexible hose or the like 26 by suitable connecting means 28. Along the length of tube 24, there are provided peripheral bands 30 for retaining electrical line 22 in contiguous longitudinal engagement with the outer periphery of tubular member 24.

Also shown in FIG. 2 is a motor 32 operable to rotate picker head member 34 through shaft 36 and belt 38. Picker head 34 is rotatably supported on tubular member 40 by means of bearings 42.

As best seen in FIG. 3, picker head 34 is provided with a plurality of resilient diaphragms 44 each having an aperture 46 therein. In the preferred embodiment of this invention, apertures 46 are of an oval configuration, but it should be understood that other configurations such as circular, square, triangular, pentagonal, or the like may be used providing sufficient vacuum can be created to suck the fruit into the picker head 34. The preferred embodiment of five diaphragms is shown in FIG. 3. However, with too few diaphragms, the frictional engagement with the fruit to produce torque will not be sufficient, whereas with too many diaphragms, the fruit will encounter too much frictional resistance passing through the opening. Three to seven diaphragms would under most circumstances be the operable number. The diaphragms 44 are shown as being attached to picker head 34 by means of bolts 48 and annular spacers 50, however, it will be apparent that any suitable means may be employed for securing the diaphragms 44.

Figure 4:
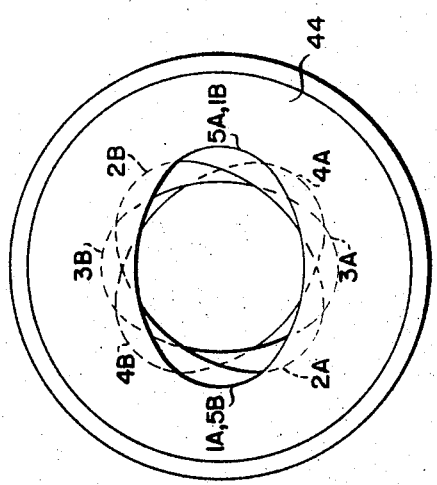
FIG. 4 is an end view of the fruit picking head shown in FIG. 3 viewed in the direction of arrows 4—4.
Figure 5:
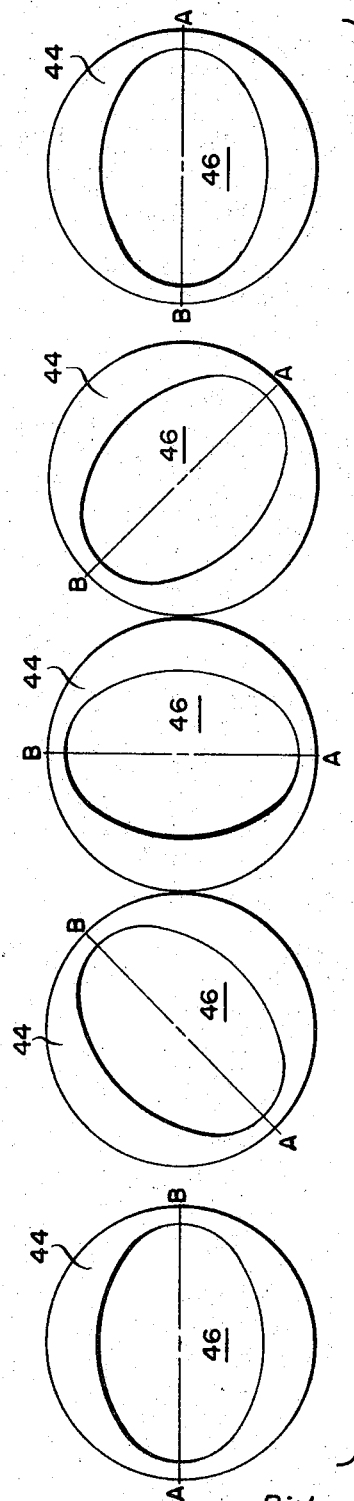
FIG. 5 is a diagrammatic view of the orientation of the apertures of the diaphragms shown in FIG. 3.

FIGS. 4 and 5 show the radial orientation of oval apertures 46 about the longitudinal axis of picker head 34. While the diaphragms are not rotatable with respect to picker head 34, the major axis of each succeeding aperture is radially advanced about the longitudinal axis of picker head 34 with respect to the preceding aperture. Thus 1 may indicate the position of the aperture of the outermost diaphragm, 2 would indicate the position of the next outermost aperture, 3 would indicate the position of the third outermost diaphragm, 4 would indicate the position of the fourth outermost aperture, and 5 would indicate the position of the aperture of the innermost diaphragm. Thus it is seen how the major axis, A–B, would be oriented for each successive aperture. As the fruit passes through each succeeding aperture, it is twisted by the same amount as the degree to which the aperture is radially advanced. The axial distance between diaphragms should be from about 1/8 inch to 3/4 inch depending upon the size of the fruit to be picked. Small fruit requires a smaller distance between diaphragms.

Figure 7:
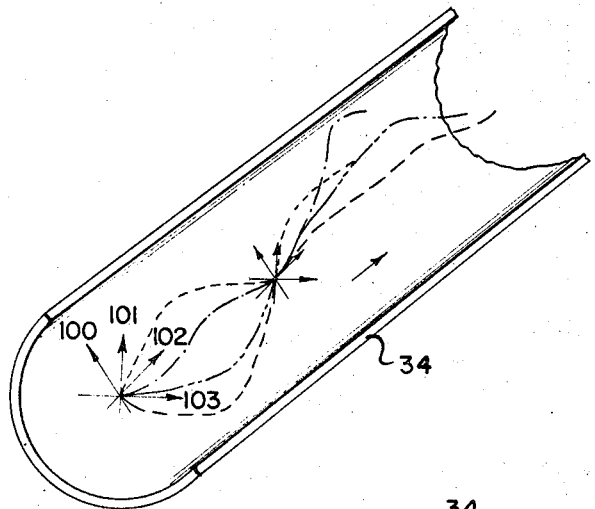
FIG. 7 is a diagrammatic view illustrating the paths which a piece of fruit would take in passing through the picking head.

FIG. 7 illustrates diagrammatically the path which is taken by a fruit as it passes through the picking head 34, with each different type of line representing a path for a different rotational position of picker head 34. Thus with the major axis of the outermost aperture lying in the direction of arrow 100, the path of the orange would be indicated by the short-dashed line. With the major axis of the outermost aperture lying in the direction of arrow 101, the path of the orange would be indicated by the dash-dot line. With the major axis of the outermost aperture oriented in the direction of arrow 102, the path of the orange would be indicated by the dash-dot-dot line. And, with the major axis of the outermost aperture lying in the direction of arrow 103, the path of the orange would be indicated by the long-dashed line. In this manner, it can be seen that with the picker head 34 stationary, a twisting motion is imparted to the fruit as it passes through picker head 34.

FIG. 6 shows an alternate embodiment of this invention wherein the center of the oval aperture of each successive diaphragm is offset from the longitudinal axis of the picker head. In this manner the twisting force which is imparted to the fruit as it passes through the different spatially oriented apertures is augmented.

It will be seen that the diameter of the fruit which may be picked may be of any length between the lengths of the major and minor axis of the oval apertures. In this manner, great versatility may be achieved.

Figure 8:
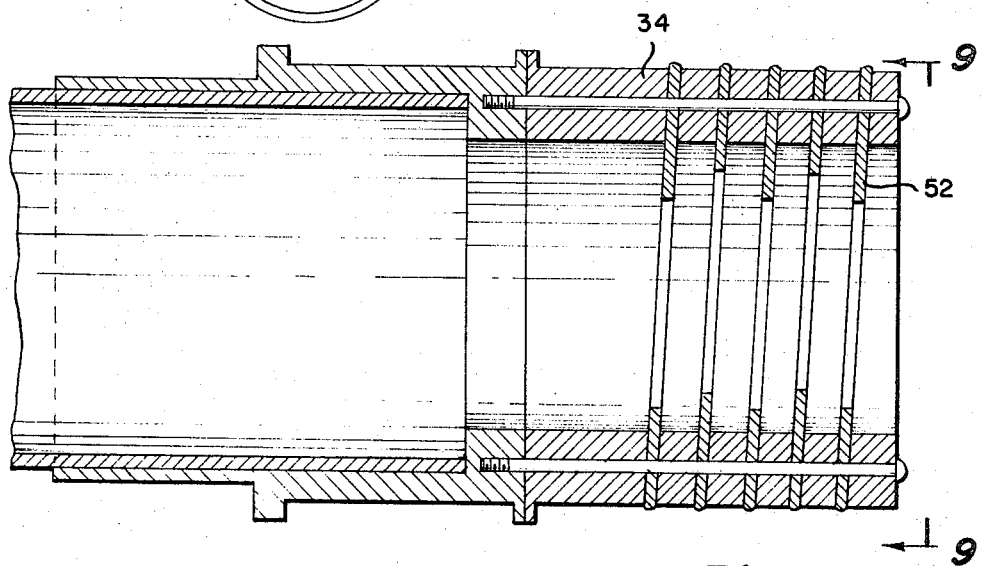
FIG. 8 is a sectional view of the fruit picking head of this invention showing another embodiment thereof.
Figure 9:
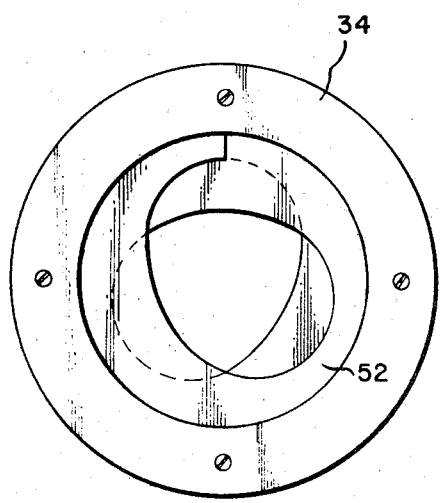
FIG. 9 is an end view of the embodiment of FIG. 7 viewed in the direction of arrows 9—9.

FIG. 8 illustrates an additional embodiment of this invention wherein a single diaphragm 52 member is spirally arranged within the central passageway of picker head 34. FIG. 9 is an end view of the embodiment of FIG. 8, showing the passageway through which the fruit travels. It can be seen that a twisting motion would be imparted to the fruit to assist in picking the fruit from the stem.

It will be appreciated that the twisting motion will be imparted to the fruit being picked regardless whether the picker head is stationary, however, in the preferred embodiment of this invention, the picker head is rotated to further assist in removing the fruit from the stem.

While this invention has been described in connection with different embodiments thereof, it will be understood that it is capable of further modification, and this application is intended to cover any variations, uses, or adaptations of the invention following, in general, the principals of the invention and including such departures from the present disclosure as common within known or customary practice in the art to which the invention pertains, and as may be applied to the essential features hereinbefore set forth as well as fall within the scope of the invention or the limits of appended claims.

What I claim is:

1. A fruit picking device including:
   (a) a tubular member through which fruit may pass,
   (b) suction producing means connected to one end of said tubular member,
   (c) picker head means connected to the other end of said tubular member and having an opening therein for receiving fruit and directing the fruit to said tubular member,
   (d) means within said picker head means defining a tortuous path through which the fruit must pass,
   (e) whereby the fruit is twisted and pulled from its stem when the picker head opening is placed adjacent the fruit.

2. A fruit picking device as in claim 1 and wherein:
   (a) said tortuous path is sinusoidal with respect to the longitudinal axis of said picker head.
3. A fruit picking device as in claim 1 and wherein:
   (a) said tortuous path is helical.
4. A fruit picking device as in claim 1 and wherein:
   (a) said means within said picker head means defining said tortuous path includes a plurality of substantially parallel, spaced, resilient members, each lying in a plane substantially transverse to the longitudinal axis of said picker head means, and each of said members having an aperture therethrough.
5. A fruit picking device as in claim 4 and wherein:
   (a) the apertures are substantially oval.
6. A fruit picking device as in claim 5 and wherein:
   (a) the major axis of each aperture is advanced radially about the longitudinal axis of said picker head means with respect to the major axis of the next preceding oval aperture.
7. A fruit picking device as in claim 6 and wherein:
   (a) the center of each of the apertures lies on the longitudinal axis of said picker head means.
8. A fruit picking device as in claim 6 and wherein:
   (a) the center of at least one of the apertures lies on the longitudinal axis of said picker head means, and
   (b) the center of at least another of the apertures is eccentric to the longitudinal axis of said picker head means.
9. A fruit picking device as in claim 6 and wherein:
   (a) the centers of the apertures lie on a helical axis lying within said picker head means and substantially concentric with the longitudinal axis of said picker head means.
10. A fruit picking device as in claim 2 and wherein:
    (a) said means within said picker head means defining said tortuous path includes a plurality of substantially parallel, spaced, resilient members, each lying in a plane substantially transverse to the longitudinal axis of said picker head means, and each of said members having an aperture therethrough.
11. A fruit picking device as in claim 10 and wherein:
    (a) the apertures are substantially oval.
12. A fruit picking device as in claim 11 and wherein:
    (a) the major axis of each aperture is advanced radially about the longitudinal axis of said picker head means with respect to the major axis of the next preceding oval aperture.
13. A fruit picking device as in claim 12 and wherein:
    (a) the center of at least one of the apertures lies on the longitudinal axis of said picker head means, and
    (b) the center of at least another of the apertures is eccentric to the longitudinal axis of said picker head means.
14. A fruit picking device as in claim 3 and wherein:
    (a) said means within said picker head means defining said tortuous path includes a plurality of substantially parallel, spaced, resilient members, each lying in a plane substantially transverse to the longitudinal axis of said picker head means, and each of said members having an aperture therethrough.
15. A fruit picking device as in claim 14 and wherein:
    (a) the apertures are substantially oval.
16. A fruit picking device as in claim 15 and wherein:
    (a) the major axis of each aperture is advanced radially about the longitudinal axis of said picker head means with respect to the major axis of the next preceding oval aperture.
17. A fruit picking device as in claim 16 and wherein:
    (a) the center of each of the apertures lies on the longitudinal axis of said picker head means.
18. A fruit picking device as in claim 16 and wherein:
    (a) the center of at least one of the apertures lies on the longitudinal axis of said picker head means, and
    (b) the center of at least another of the apertures is eccentric to the longitudinal axis of said picker head means.

19. A fruit picking device as in claim 16 and wherein:
(a) the centers of the apertures lie on a helical axis lying within said picker head means and substantially concentric with the longitudinal axis of said picker head means.

20. A fruit picking device as in claim 16 and including:
(a) means for rotating said picker head means.

21. A fruit picking device as in claim 12 and including:
(a) means for rotating said picker head means.

22. A fruit picking device as in claim 6 and including:
(a) means for rotating said picker head means.

23. A fruit picking device as in claim 1 and wherein:
(a) said means within said picker head means defining said tortuous path includes a continuous resilient coil progressing longitudinally within said picker head means, each turn of said coil being spaced from the next adjacent turn of said coil.

24. A fruit picking device as in claim 23 and wherein:
(a) said tortuous path is sinusoidal with respect to the longitudinal axis of said picker head means.

25. A fruit picking device as in claim 23 and wherein:
(a) said tortuous path is helical.

26. A fruit picking device as in claim 23 and including:
(a) means for rotating said picker head means.

References Cited

UNITED STATES PATENTS

| | | | |
|---|---|---|---|
| 2,545,072 | 3/1951 | Denman | 56—332 |
| 2,711,625 | 6/1955 | Bullock | 56—332 |
| 2,775,088 | 12/1956 | Bullock | 56—332 |
| 2,968,907 | 1/1961 | Bernheim et al. | 56—332 |
| 3,165,880 | 1/1965 | Buie | 56—336 |
| 3,306,019 | 2/1967 | MacCordy | 56—332 |
| 3,413,787 | 12/1968 | Van Antwerp et al. | 56—328 |
| 3,420,046 | 1/1969 | Johnson et al. | 56—330 |

RUSSELL R. KINSEY, Primary Examiner